(12) United States Patent
Choudhary et al.

(10) Patent No.: US 7,641,813 B2
(45) Date of Patent: Jan. 5, 2010

(54) ANTIFREEZE COMPOSITIONS

(75) Inventors: Anil Choudhary, Mumbai (IN);
Mouhcine Kanouni, New York, NY (US)

(73) Assignee: Ciba Corporation, Tarrytown, NY (US)

( * ) Notice: Subject to any disclaimer, the term of this patent is extended or adjusted under 35 U.S.C. 154(b) by 0 days.

(21) Appl. No.: 12/286,261

(22) Filed: Sep. 29, 2008

(65) Prior Publication Data

US 2009/0090887 A1 Apr. 9, 2009

Related U.S. Application Data

(60) Provisional application No. 60/997,418, filed on Oct. 3, 2007.

(51) Int. Cl.
*C09K 5/00* (2006.01)
*C09K 5/20* (2006.01)
(52) U.S. Cl. .............................. 252/73; 252/71; 252/74; 252/75; 252/76; 252/77; 252/78.1; 252/79; 106/14.05; 106/14.41; 106/14.42
(58) Field of Classification Search ................... 252/71, 252/73, 74, 75, 76, 77, 78.1, 79; 106/14.05, 106/14.41, 14.42
See application file for complete search history.

(56) References Cited

U.S. PATENT DOCUMENTS

| | | | | |
|---|---|---|---|---|
| 4,683,071 A | 7/1987 | Regenass et al. | ........... | 252/49.3 |
| 5,076,951 A | 12/1991 | Miles et al. | ................... | 252/79 |
| 6,126,852 A | 10/2000 | Turcotte et al. | ............... | 252/76 |
| 6,309,559 B1 | 10/2001 | Minks et al. | .................. | 252/75 |

FOREIGN PATENT DOCUMENTS

WO      WO01/00902 A1 *  1/2001

* cited by examiner

*Primary Examiner*—Anthony J Green
(74) *Attorney, Agent, or Firm*—Tyler A. Stevenson

(57) ABSTRACT

Disclosed is an antifreeze composition comprising a) a water soluble liquid alcohol freezing point depressant, b) a triazine based compound of formula I, c) a mixture of tolutriazole compounds of formulae II and III, d) 2-ethylhexanoic acid or alkali metal salts thereof, e) heptanoic acid or alkali metal salts thereof and f) water, where the compounds of formula I are

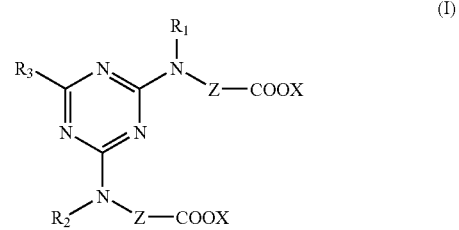

(I)

where Z is a $C_1$-$C_{11}$ alkylene group, X is hydrogen or an alkali metal, $R_1$ and $R_2$, independently are hydrogen or methyl, $R_3$ is a group —$NR_4R_5$ where $R_4$ is $C_1$-$C_{12}$ alkyl or -Z-COOX and $R_5$ is hydrogen or $C_1$-$C_{12}$ alkyl; and where the compounds of formulae II and III are

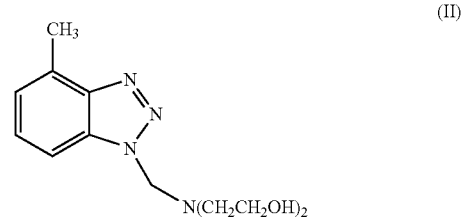

(II)

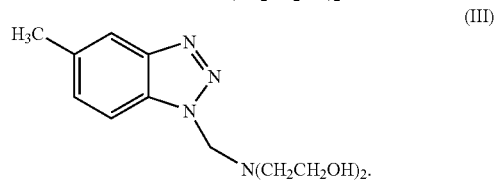

(III)

16 Claims, No Drawings

ANTIFREEZE COMPOSITIONS

This application claims benefit of U.S. provisional app. No. 60/997,418, filed Oct. 3, 2007, the contents of which are incorporated by reference.

The present invention is aimed at aqueous antifreeze compositions. The antifreeze compositions protect metals from corrosion and are effective in preventing hard water deposits.

BACKGROUND

U.S. Pat. No. 6,126,852 is aimed at acid based antifreeze formulations. The acids are monobasic aliphatic organic acids or the alkali metal salts thereof.

U.S. Pat. No. 5,076,951 teaches polyhydric alcohol antifreeze compositions. The compositions comprise certain triazine corrosion inhibitors.

U.S. Pat. No. 4,683,071 discloses antifreeze, hydraulic and metal-working functional fluids that contain a mixture of a certain tolutriazole compounds.

There remains a need for improving antifreeze compositions, especially regarding prevention of corrosion of metals and in preventing hard water deposits. The metal to be protected is for example aluminum and the deposits are for example calcium salt deposits.

Surprisingly, it has been found that the present antifreeze compositions are especially effective towards these ends.

SUMMARY

Disclosed is an antifreeze composition comprising
a) a water soluble liquid alcohol freezing point depressant,
b) a triazine based compound of formula I,
c) a mixture of tolutriazole compounds of formulae II and III,
d) 2-ethylhexanoic acid or an alkali metal salt thereof,
e) heptanoic acid or an alkali metal salt thereof and
f) water,
where the compounds of formula I are

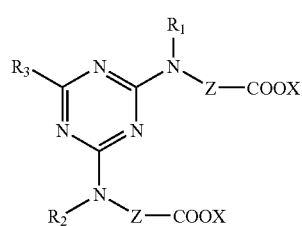

(I)

where
Z is a $C_1$-$C_{11}$ alkylene group,
X is hydrogen or an alkali metal,
$R_1$ and $R_2$, independently are hydrogen or methyl,
$R_3$ is a group —$NR_4R_5$ where $R_4$ is $C_1$-$C_{12}$ alkyl or -Z-COOX and
$R_5$ is hydrogen or $C_1$-$C_{12}$ alkyl; and
where the compounds of formulae II and III are

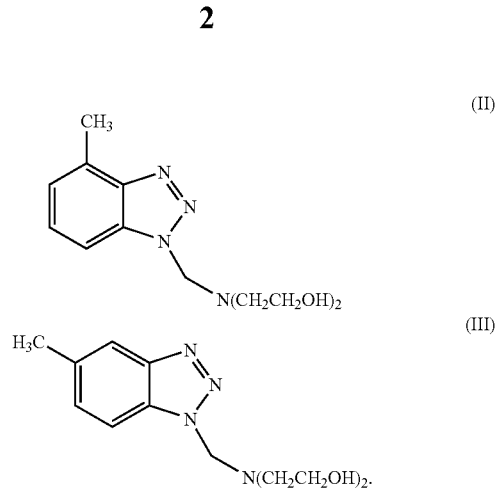

DETAILED DISCLOSURE

The antifreeze, or coolant or heat exchange formulations are based on water and water soluble liquid alcohol freezing point depressants such as glycols and glycol ethers. The glycols are for example ethylene glycol, diethylene glycol, propylene glycol and dipropylene glycol. Ethers are for example glycol mono ethers such as the methyl, ethyl, propyl and butyl ethers of ethylene glycol, diethylene glycol, propylene glycol and dipropylene glycol. For instance, the freezing point depressant is ethylene glycol.

The liquid alcohol freezing point depressants are for example employed from about 3% to about 9% by weight, based on the entire weight of the composition (formulation). For instance, they are employed at about 3%, 4%, 5%, 6%, 7%, 8% or about 8% by weight based on the weight of the composition.

The triazine based compounds of formula I are disclosed in U.S. Pat. No. 5,076,951, the disclosure of which is hereby incorporated by reference. The synthesis of these compounds is described for example in U.S. Pat. No. 3,697,520, also incorporated by reference.

The triazine based compounds are for example
2,4,6-tris(5-carboxypentylamino)-1,3,5-triazine,
2,4,6-tris(carboxymethylamino)-1,3,5-triazine,
2,4,6-tris(3-carboxypropylamino)-1,3,5-triazine,
2,4,6-tris(4-carboxybutylamino)-1,3,5-triazine,
2,4,6-tris(11-carboxyundecylamino)-1,3,5-triazine,
2,4,6-tris(5-carboxypentyl-N-methylamino)-1,3,5-triazine,
2,4,6-tris(carboxymethyl-N-methylamino)-1,3,5-triazine,
2,4,6-tris(3-carboxypropyl-N-methylamino)-1,3,5-triazine,
2,4-bis(5-carboxypentylamino)-6-n-octylamino-1,3,5-triazine,
2,4-bis(2-carboxyethylamino)-6-n-octylamino-1,3,5-triazine,
2,4-bis(2-carboxyethylamino)-6-diethylamino-1,3,5-triazine,
2,4-bis(2-carboxyethylamino)-6-butylamino-1,3,5-triazine,
2,4-bis(2-carboxyethylamino)-6-ethylamino-1,3,5-triazine,
2,4-bis(3-carboxypropylamino)-6-ethylamino-1,3,5-triazine,
2,4-bis(3-carboxypropylamino)-6-n-octylamino-1,3,5-triazine,
2,4-bis(3-carboxypropylamino)-6-n-propylamino-1,3,5-triazine,
2,4-bis(carboxymethylamino)-6-n-octylamino-1,3,5-triazine, 2,4-bis(carboxymethylamino)-6-docecylamino-1,3-5-triazine,
2,4-bis(5-carboxypentyl-N-methylamino)-6-ethylamino-1,3,5-triazine,
2,4-bis(3-carboxypropyl-N-methylamino)-6-n-octylamino-1,3,5-triazine,
2,4-bis(carboxymethyl-N-methylamino)-6-n-octylamino-1,3,5-triazine,
2,4-bis(2-carboxyethyl-N-methylamino)-6-n-octylamino-1,3,5-triazine,
2,4-bis(5-carboxypentylamino)-6-(2-carboxyethylamino)-1,3,5-triazine,
2,4-bis(5-carboxypentylamino)-6-(carboxymethylamino)-1,3,5-triazine,
2,4-bis(3-carboxypropylamino)-6-(2-carboxyethylamino)-1,3,5-triazine,
2,4-bis(2-carboxyethylamino)-6-(5-carboxypentylamino)-1,3,5-triazine or
2,4-bis(3-carboxyethylamino)-6-(5-carboxypentylamino)-1,3,5-traizine.

For instance, the triazine based compounds are
2,4,6-tris(5-carboxypentylamino)-1,3,5-triazine,
2,4,6-tris(carboxymethylamino)-1,3,5-triazine,
2,4,6-tris(3-carboxypropylamino)-1,3,5-triazine or
2,4,6-tris(4-carboxybutylamino)-1,3,5-triazine.

The triazine based compounds of formula I are employed for example from about 6% to about 14% by weight, based on the weight of the entire composition. For example, the triazine compounds of formula I are employed at about 6%, 8%, 10%, 12% or about 14% by weight, based on the weight of the composition.

The compounds of formulae II and III are taught for instance in U.S. Pat. No. 4,683,071, the contents of which are hereby incorporated by reference. The mixture of compounds of formulae II and III contains for example from about 50 to about 70 parts by weight formula II and from about 50 parts to about 30 parts by weight formula III.

The compounds of formula II and III are employed for example from about 1% to about 4% by weight, based on the weight of the entire composition. For instance, the compounds of formula II and III are present at about 1%, 2%, 3% or 4% by weight, based on the weight of the composition.

The alkali salts of 2-ethylhexanoic and heptanoic acid are for instance sodium or potassium salts. For example they are potassium salts.

The 2-ethylhexanoic acid or its salts together with heptanoic acid or its salts are for example employed from about 20% to about 60% by weight, based on the weight of the entire composition. For instance, 2-ethylhexanoic acid or its salts together with heptanoic acid or its salts are employed at about 20%, 30%, 40%, 50% or about 60% by weight, based on the weight of the composition.

The weight/weight ratio of 2-ethylhexanoic acid or its salts to heptanoic acid or its salts is for example from about 1:9 to about 9:1. For instance the weight:weight ratio is from about 1:7 to about 7:1, from about 1:5 to about 5:1, from about 1:3 to about 3:1 or from about 1:2 to about 2:1.

The remaining weight of the formulation is made up of water.

The present antifreeze or coolant compositions may not contain for example known inorganic antifreeze components such as silicates, phosphates, nitrates, borates or nitrites.

The present coolants are effective in suppressing the corrosion of a variety of metals including aluminum, aluminum alloys, copper, steel, cast iron, brass, solder and the like. The present formulations provide for outstanding prevention of aluminum corrosion. The present formulations also provide for excellent resistance to hard water precipitates and scale. The formulations are particularly suitable for automotive gasoline and diesel engine coolant applications. The formulations provide for surprising long coolant life characteristics in engine testing.

Optionally, other components may be present in the coolants of this invention, including defoamers, dyes, bittering agents, biocides and the like. Defoamers are commonly used and are for example silicone based surfactants.

The pH range of the composition is for instance from about 8.0 to about 10.0. For example, the pH of the composition is about 8.0, 8.5, 9.0, 9.5 or about 10.0. For instance, the pH is from about 8.5 to about 9.8.

The antifreeze compositions of this invention may be exposed to hard water containing ca. 700 ppm calcium without exhibiting precipitation after 7 days.

Also subject of the present invention is an additive combination useful for antifreeze compositions based on water and water soluble freezing point depressants, said combination comprising b) a triazine based compound of formula I, c) a mixture of tolutriazole compounds of formulae II and III, d) 2-ethylhexanoic acid or an alkali metal salt thereof and e) heptanoic acid or an alkali metal salt thereof.

EXAMPLES

The following Examples illustrate the present invention. Unless indicated, parts and percentages are by weight.

Example 1

The following antifreeze formulation is prepared:

| | Kg |
|---|---|
| monomethyl ethylene glycol | 45 |
| 2-ethylhexanoic acid | 220 |
| heptanoic acid | 140 |
| 2,4,6-tris(3-carboxypentylamino)-1,3,5-triazine | 100 |
| 50% KOH | 236 |
| 1:1 tolutriazole mixture of II and III | 25 |
| water | 234 |

The multi-metal corrosion test—ASTM 1384—is performed with this formulation.

| Item | Specified Value | Result |
|---|---|---|
| 1. multimetal corrosion property 30 vol % test solution, 336 ± 2 hours at 88 ± 2° C. weight changes in mg/cm$^2$ | | |
| aluminum casting | ±0.30 | −0.098 |
| cast iron | ±0.15 | −0.042 |
| steel | ±0.15 | −0.018 |
| brass | ±0.15 | −0.049 |
| solder | ±0.30 | −0.032 |
| copper | ±0.15 | −0.05 |
| 2. appearance | no corrosion | no corrosion |
| 3. foaming | no foaming flooding out of cooler | no foaming flooding out of cooler |

-continued

| Item | Specified Value | Result |
|---|---|---|
| 4. properties of solution after test | | |
| pH | 6.5-11.0 | 8.3 |
| change of pH | ±1.0 | ±0.15 |
| rate of change of reserve alkalinity (%) | to be reported | −3.92 |
| liquid phase | no color change or gelation | no color change or gelation |
| amount of precipitate (vol %) | 0.5 max | 0 |

What is claimed is:

1. An antifreeze composition comprising
a) a water soluble liquid alcohol freezing point depressant,
b) a triazine based compound of formula I,
c) a mixture of tolutriazole compounds of formulae II and III,
d) 2-ethylhexanoic acid or an alkali metal salt thereof,
e) heptanoic acid or an alkali metal salt thereof and
f) water,
where the compounds of formula I are

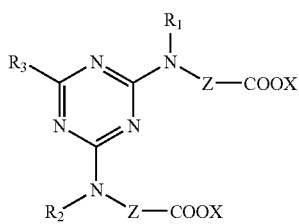

where
Z is a $C_1$-$C_{11}$ alkylene group,
X is hydrogen or an alkali metal,
$R_1$ and $R_2$, independently are hydrogen or methyl,
$R_3$ is a group —$NR_4R_5$ where $R_4$ is $C_1$-$C_{12}$ alkyl or -Z-COOX and
$R_5$ is hydrogen or $C_1$-$C_{12}$ alkyl; and
where the compounds of formulae II and III are

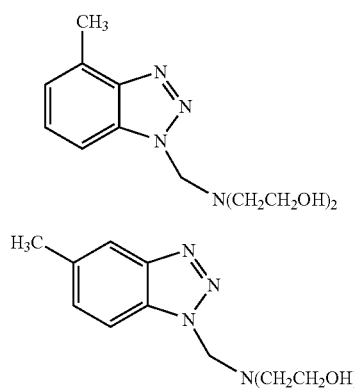

where 2-ethylhexanoic acid or its alkali salt together with heptanoic acid or its alkali salt are present from about 20% to about 60% by weight, based on the weight of the composition.

2. A composition according to claim 1 where in the compounds of formula I, $R_3$ is —$NR_4R_5$ where $R_4$ is -Z-COOX.

3. An antifreeze composition according to claim 1 where the compounds of formula I are selected from the group consisting of
2,4,6-tris(5-carboxypentylamino)-1,3,5-triazine,
2,4,6-tris(carboxymethylamino)-1,3,5-triazine,
2,4,6-tris(3-carboxypropylamino)-1,3,5-triazine,
2,4,6-tris(4-carboxybutylamino)-1,3,5-triazine,
2,4,6-tris(11-carboxyundecylamino)-1,3,5-triazine,
2,4,6-tris(5-carboxypentyl-N-methylamino)-1,3,5-triazine,
2,4,6-tris(carboxymethyl-N-methylamino)-1,3,5-triazine,
2,4,6-tris(3-carboxypropyl-N-methylamino)-1,3,5-triazine,
2,4-bis(5-carboxypentylamino)-6-n-octylamino-1,3,5-triazine,
2,4-bis(2-carboxyethylamino)-6-n-octylamino-1,3,5-triazine,
2,4-bis(2-carboxyethylamino)-6-diethylamino-1,3,5-triazine,
2,4-bis(2-carboxyethylamino)-6-butylamino-1,3,5-triazine,
2,4-bis(2-carboxyethylamino)-6-ethylamino-1,3,5-triazine,
2,4-bis(3-carboxypropylamino)-6-ethylamino-1,3,5-triazine,
2,4-bis(3-carboxypropylamino)-6-n-octylamino-1,3,5-triazine,
2,4-bis(3-carboxypropylamino)-6-n-propylamino-1,3,5-triazine,
2,4-bis(carboxymethylamino)-6-n-octylamino-1,3,5-triazine,
2,4-bis(carboxymethylamino)-6-docecylamino-1,3-5-triazine,
2,4-bis(5-carboxypentyl-N-methylamino)-6-ethylamino-1,3,5-triazine,
2,4-bis(3-carboxypropyl-N-methylamino)-6-n-octylamino-1,3,5-triazine,
2,4-bis(carboxymethyl-N-methylamino)-6-n-octylamino-1,3,5-triazine,
2,4-bis(2-carboxyethyl-N-methylamino)-6-n-octylamino-1,3,5-triazine,
2,4-bis(5-carboxypentylamino)-6-(2-carboxyethylamino)-1,3,5-triazine,
2,4-bis(5-carboxypentylamino)-6-(carboxymethylamino)-1,3,5-triazine,
2,4-bis(3-carboxypropylamino)-6-(2-carboxyethylamino)-1,3,5-triazine,
2,4-bis(2-carboxyethylamino)-6-(5-carboxypentylamino)-1,3,5-triazine and
2,4-bis(3-carboxyethylamino)-6-(5-carboxypentylamino)-1,3,5-triazine.

4. A composition according to claim 1 where the compounds of formula I are
2,4,6-tris(5-carboxypentylamino)-1,3,5-triazine,
2,4,6-tris(carboxymethylamino)-1,3,5-triazine,
2,4,6-tris(3-carboxypropylamino)-1,3,5-triazine or
2,4,6-tris(4-carboxybutylamino)-1,3,5-triazine.

5. A composition according to claim 1 where components c) and d) are sodium or potassium salts.

6. A composition according to claim 1 where components c) and d) are potassium salts.

7. A composition according to claim 1 where the pH is from about 8.0 to about 10.0.

8. A composition according to claim 1 where the pH is from about 8.5 to 9.8.

9. A composition according to claim 1 where the freezing point depressant is ethylene glycol, diethylene glycol, propylene glycol, dipropylene glycol, monomethylethylene glycol or is a combination of two or more of these alcohols.

10. A composition according to claim 1 where the freezing point depressant is present from about 3% to about 9% by weight, based on the weight of the composition.

11. A composition according to claim 1 where the triazine based compound of formula I is present from about 6% to about 14% by weight, based on the weight of the composition.

12. A composition according to claim 1 where the mixture of compounds of formulae II and III is present from about 1% to about 4% by weight, based on the weight of the composition.

13. An additive combination useful for antifreeze compositions that are based on water and water soluble freezing point depressants, said combination comprising
   b) a triazine based compound of formula I,
   c) a mixture of tolutriazole compounds of formulae II and III,
   d) 2-ethylhexanoic acid or an alkali metal salt thereof and
   e) heptanoic acid or an alkali metal salt thereof,
   where the compounds of formula I are

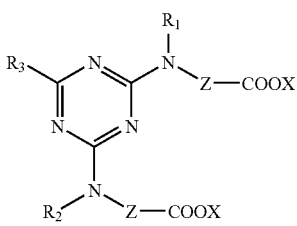

(I)

where
$Z$ is a $C_1$-$C_{11}$ alkylene group,
$X$ is hydrogen or an alkali metal,
$R_1$ and $R_2$, independently are hydrogen or methyl,
$R_3$ is a group —$NR_4R_5$ where $R_4$ is $C_1$-$C_{12}$ alkyl or -Z-COOX and
$R_5$ is hydrogen or $C_1$-$C_{12}$ alkyl; and
where the compounds of formulae II and III are

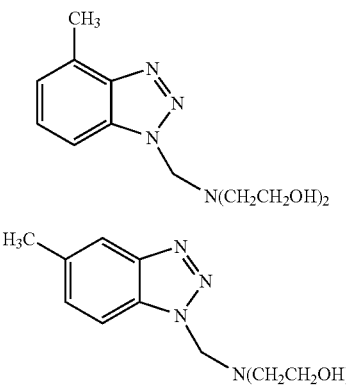

(II)

(III)

where 2-ethylhexanoic acid or its alkali salt together with heptanoic acid or its alkali salt are present from about 20% to about 60% by weight, based on the weight of the composition.

14. An additive combination according to claim 13 where in the compounds of formula I, $R_3$ is —$NR_4R_5$ where $R_4$ is -Z-COOX.

15. An additive combination according to claim 13 where the compounds of formula I are selected from the group consisting of
   2,4,6-tris(5-carboxypentylamino)-1,3,5-triazine,
   2,4,6-tris(carboxymethylamino)-1,3,5-triazine,
   2,4,6-tris(3-carboxypropylamino)-1,3,5-triazine,
   2,4,6-tris(4-carboxybutylamino)-1,3,5-triazine,
   2,4,6-tris(11-carboxyundecylamino)-1,3,5-triazine,
   2,4,6-tris(5-carboxypentyl-N-methylamino)-1,3,5-triazine,
   2,4,6-tris(carboxymethyl-N-methylamino)-1,3,5-triazine,
   2,4,6-tris(3-carboxypropyl-N-methylamino)-1,3,5-triazine,
   2,4-bis(5-carboxypentylamino)-6-n-octylamino-1,3,5-triazine,
   2,4-bis(2-carboxyethylamino)-6-n-octylamino-1,3,5-triazine,
   2,4-bis(2-carboxyethylamino)-6-diethylamino-1,3,5-triazine,
   2,4-bis(2-carboxyethylamino)-6-butylamino-1,3,5-triazine,
   2,4-bis(2-carboxyethylamino)-6-ethylamino-1,3,5-triazine,
   2,4-bis(3-carboxypropylamino)-6-ethylamino-1,3,5-triazine,
   2,4-bis(3-carboxypropylamino)-6-n-octylamino-1,3,5-triazine,
   2,4-bis(3-carboxypropylamino)-6-n-propylamino-1,3,5-triazine,
   2,4-bis(carboxymethylamino)-6-n-octylamino-1,3,5-triazine,
   2,4-bis(carboxymethylamino)-6-docecylamino-1,3,5-triazine,
   2,4-bis(5-carboxypentyl-N-methylamino)-6-ethylamino-1,3,5-triazine,
   2,4-bis(3-carboxypropyl-N-methylamino)-6-n-octylamino-1,3,5-triazine,
   2,4-bis(carboxymethyl-N-methylamino)-6-n-octylamino-1,3,5-triazine,
   2,4-bis(2-carboxyethyl-N-methylamino)-6-n-octylamino-1,3,5-triazine,
   2,4-bis(5-carboxypentylamino)-6-(2-carboxyethylamino)-1,3,5-triazine,
   2,4-bis(5-carboxypentylamino)-6-(carboxymethylamino)-1,3,5-triazine,
   2,4-bis(3-carboxypropylamino)-6-(2-carboxyethylamino)-1,3,5-triazine,
   2,4-bis(2-carboxyethylamino)-6-(5-carboxypentylamino)-1,3,5-triazine and
   2,4-bis(3-carboxyethylamino)-6-(5-carboxypentylamino)-1,3,5-traizine.

16. An additive combination according to claim 13 where the compounds of formula I are
   2,4,6-tris(5-carboxypentylamino)-1,3,5-triazine,
   2,4,6-tris(carboxymethylamino)-1,3,5-triazine,
   2,4,6-tris(3-carboxypropylamino)-1,3,5-triazine or
   2,4,6-tris(4-carboxybutylamino)-1,3,5-triazine.

* * * * *